US012683992B2

(12) United States Patent　　(10) Patent No.:　US 12,683,992 B2
Liu et al.　　(45) Date of Patent:　　Jul. 14, 2026

(54) METHODS AND SYSTEMS FOR EFFICIENTLY DETECTING AND RECORDING SECURITY ANOMALIES

(71) Applicant: Microsoft Technology Licensing, LLC, Redmond, WA (US)

(72) Inventors: Yingqi Liu, Sunnyvale, CA (US); Leo Moreno Betthauser, Kirkland, WA (US); Lloyd Geoffrey Greenwald, Murray Hill, NJ (US); Muhammed Fatih Bulut, Newtown, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 18/429,304

(22) Filed: Jan. 31, 2024

(65) Prior Publication Data

US 2025/0247409 A1　Jul. 31, 2025

(51) Int. Cl.
*H04L 9/40*　　(2022.01)
(52) U.S. Cl.
CPC ...... *H04L 63/1425* (2013.01); *H04L 63/1441* (2013.01)
(58) Field of Classification Search
CPC .................................................. H04L 63/1425
See application file for complete search history.

(56) References Cited

U.S. PATENT DOCUMENTS

| 12,008,222 | B1 * | 6/2024 | Niv ...................... | H04L 63/1416 |
| 2016/0255109 | A1 * | 9/2016 | Koyanagi .......... | H04L 63/1425 |
| | | | | 726/23 |

| 2020/0076842 | A1 * | 3/2020 | Zhou ...................... | G06N 3/084 |
| 2022/0091916 | A1 * | 3/2022 | Liu ......................... | G06F 11/076 |
| 2022/0172067 | A1 * | 6/2022 | Kang ................... | G06N 3/0442 |
| 2022/0217156 | A1 * | 7/2022 | Wahbo ................ | H04L 63/1408 |
| 2023/0315842 | A1 * | 10/2023 | dos Santos Silva .. | G06F 21/554 |
| | | | | 726/23 |
| 2025/0133094 | A1 * | 4/2025 | Chagas .................. | G06N 3/098 |

FOREIGN PATENT DOCUMENTS

WO　　WO-2023016537 A1 *　2/2023　.............. G06F 11/07

OTHER PUBLICATIONS

Du et al., DeepLog: Anomaly Detection and Diagnosis from System Logs through Deep Learning, 2017. (Year: 2017).*
He et al., Drain: An Online Log Parsing Approach with Fixed Depth Tree, 2017. (Year: 2017).*

* cited by examiner

*Primary Examiner* — Hieu T Hoang
(74) *Attorney, Agent, or Firm* — Pillsbury Winthrop Shaw Pittman, LLP

(57)　　ABSTRACT

In certain examples, an anomaly detection stage involves building an anomalous embedding database. A log embedding is extracted from an input security log using trained machine learning (ML). An anomaly detection method is used to identify the log embedding as anomalous. The log embedding is not necessarily added to the log embedding database. Rather, it is compared with existing anomalous log embeddings already stored in the anomalous embedding database, and is only added to the database if it does not match any of the existing anomalous log embeddings. Once populated, the anomalous embedding database may be used to support threat detection and mitigation in a deployment stage.

20 Claims, 7 Drawing Sheets

FIG. 7

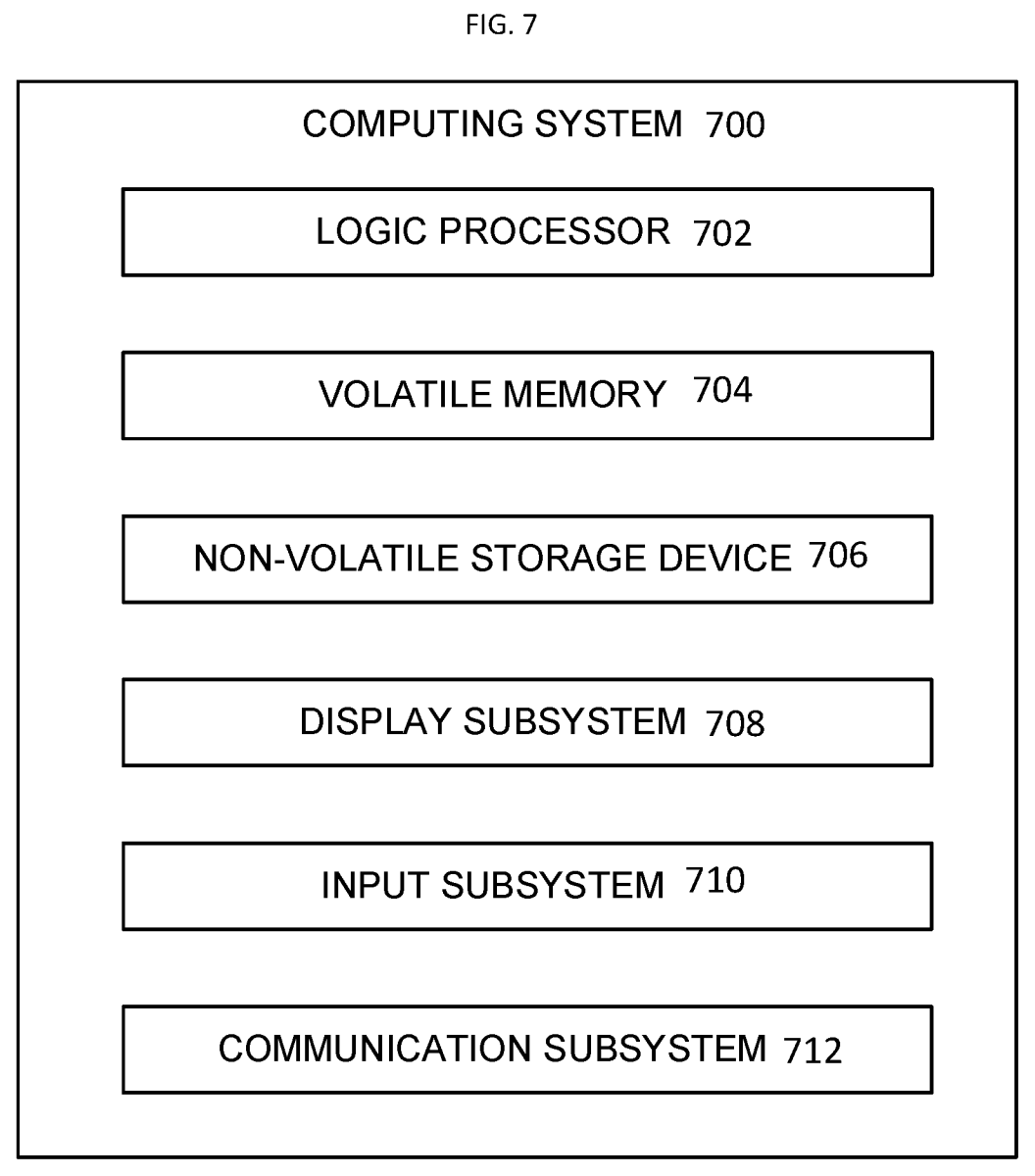

COMPUTING SYSTEM  700

LOGIC PROCESSOR  702

VOLATILE MEMORY  704

NON-VOLATILE STORAGE DEVICE  706

DISPLAY SUBSYSTEM  708

INPUT SUBSYSTEM  710

COMMUNICATION SUBSYSTEM  712

METHODS AND SYSTEMS FOR EFFICIENTLY DETECTING AND RECORDING SECURITY ANOMALIES

TECHNICAL FIELD

The present disclosure pertains to methods and systems for efficiently detecting and recording security anomalies, such as attack patterns or other anomaly patterns in a large amount of cybersecurity data.

BACKGROUND

Computer networks are used in various organizations, including businesses, universities, governmental organizations, etc. Network security is vital for keeping an organization running properly. Without such security, an organization's various computing systems and other network resources may be exposed to malicious programs. Such programs could access sensitive data, hold data and resources for ransom, or perform other damaging acts.

Security logs may be used to monitor an organisation's data, activities, computing systems, and network resources. Log files are detailed, typically text-based records of events within an organization's IT systems. They are generated by a wide variety of devices and applications, such as antimalware, system utilities, firewalls, intrusion detection and prevention systems, servers, workstations and networking equipment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

In certain examples herein, an anomaly detection stage involves building an anomalous embedding database. A set of first log embeddings is extracted from a set of first security logs using a trained machine learning (ML). An anomaly detection method is used to identify an anomalous first log embedding from amongst the set of first security log embeddings. The first log embedding is not necessarily added to the anomalous embedding database. Rather, it is compared with existing anomalous log embeddings already stored in the anomalous embedding database, and is only added to the database if it does not match any of the existing anomalous log embeddings.

Once populated, the anomalous embedding database may be used to support threat detection and mitigation in a deployment stage. For example, the anomalous embedding database may be used to support a detector which processes an incoming second security log and triggers an appropriate security mitigation action if the second security log triggers a positive threat detection. As another example, further analysis may be performed on the anomalous log embedding database (e.g., to identify specific log entities and/or specific log embedding dimensions that are relevant for anomaly detection). Such analysis may be used to tune existing detectors or build new detectors.

BRIEF DESCRIPTION OF FIGURES

Particular embodiments will now be described, by way of example only, with reference to the following schematic figures, in which:

FIG. 7 schematically shows a non-limiting example of a computing system.

DETAILED DESCRIPTION

Figure 1:
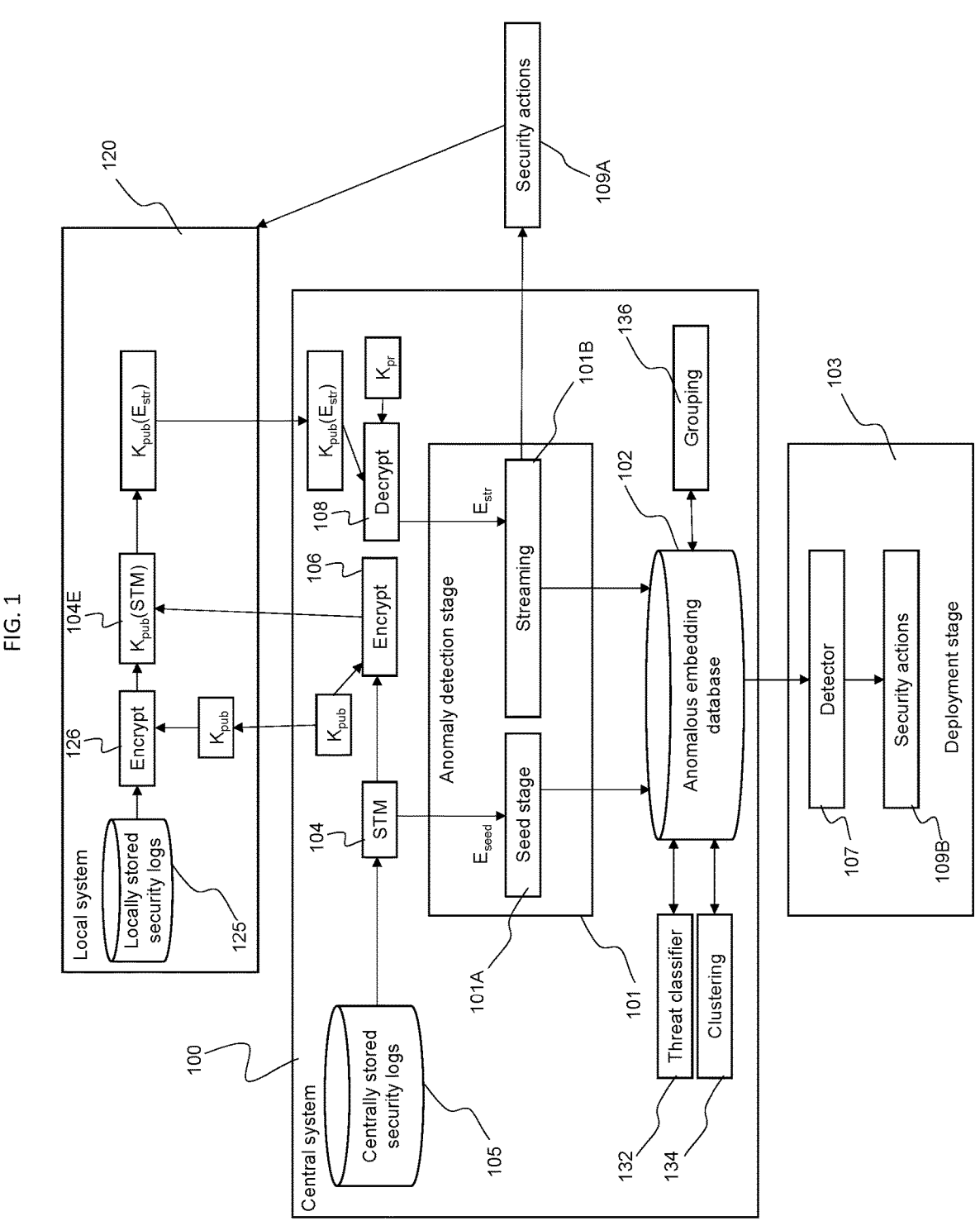
FIG. 1 shows a block diagram of the stages of the anomaly detection method.

In various examples described herein, security logs are analysed to find anomalies that are potentially indicative of malicious activities such as activities relating to cybersecurity attacks, which in turn may be stopped to prevent or reduce harm to infrastructure. For example, security log data may be used to spot unusual activities or patterns, log discrepancies, failed login attempts or login attacks, as well as unusual data access or transfers. Once an anomaly is detected, appropriate security mitigation action(s) may be taken such as an action to alert users of the computing system under attack, modify a setting or parameter of a computing system (e.g. a computer, or a network of computers), or isolate (e.g., quarantine, disconnect, deactivate etc.) an entity (e.g. user, device, service, process, application etc.) within such a computer system. An anomaly detection may trigger a further analysis to determine whether related activity is malicious or benign.

Managing security logs can be complex. Large enterprises can generate hundreds of gigabytes of logs daily. There are several challenges involved in dealing with such large amounts of continuously generated data. Logs originate from different sources come in different formats. To make data manageable, security teams may take steps to try to limit security log data being stored.

Conventional methods of logging and storing large volumes of make inefficient use of computer storage resources in a system storing the data, and inefficient use of computer processing resources in locating data that is not stored efficiently. Conventional systems and methods for storing security of data therefore suffer from issues of scalability. Whilst conventional methods of data compression may be used to reduce the size of logs stored to an extent, even compressed logs have a significant storage overhead. Therefore, such methods do not sufficiently address such inefficiency and scalability issues. Security log data may also be selectively discarded to reduce storage and processing overhead. However, inappropriate discarding of cybersecurity data means that valuable insights into cyber attack patterns are lost, which in turn leads to security vulnerabilities.

By contrast, information storage mechanisms are described herein, which enable comprehensive storage of security log information with significantly reduced computer storage overhead compared with conventional methods, and which moreover facilitate efficient search, comparison, and readability of stored security log information. Systems are described herein are able to handle large amounts of data without affecting overall system performance, and in particular without compromising on the ability of the system to detect and mitigate a wide (and growing) range of anomaly patterns some of which are cyberattack patterns. The described techniques enable cybersecurity log information to be recorded far more concisely, but with strong safeguards to ensure that information that is valuable from a security perspective is not lost. Improvements in computer processing efficiency are achieved as reduced processing overhead is required to locate and retrieve security log information that is stored concisely.

In addition, certain examples consider a scenario in which a security provider serves a user with their own infrastructure, or multiple users each with their own infrastructure, at least at the virtual level. For example, the (or each) user may operate their own physical infrastructure, or their own virtual infrastructure even if that virtual infrastructure is implemented on physical infrastructure (e.g., cloud computing infrastructure) shared with the security provider and/or other user(s). A user could be an organization in this context. A federated architecture is described, which uses an encryption mechanism to enable (1) users to privately share with the security provider information extracted from their security logs whilst protecting the logs themselves and (2) the security provider to privately share with the user(s) bespoke ML tooling to support the extraction of such information whilst protecting their ML tooling. From the user's perspective, their security logs can contain highly sensitive system information that they would not wish to share with external parties. On the other hand, the security provider has a legitimate interest in preventing unfettered use of their ML tooling.

In the following examples, information is extracted, privately shared, analysed and selectively retained in the form of embeddings. In some examples, the ML tooling takes the form of a "security transformer model" (STM), where that term is used herein to mean a transformer model (that is, an ML component with a transformer neural network architecture) trained on a security-specific dataset. An STM is one example of a domain-specific ML model specific to the domain of security.

FIG. 1 shows a schematic block diagram of a distributed computer system in one example. The distributed computer system is shown to comprise a central system 100, which may for example be operated by a security provider, and a local system 120, which may for example be operated by a user supported by the security provider. The system is local from the user's perspective, and remote from the security provider's perspective. As will be appreciated, references to users and the security provider are for illustration purposes only. The respective operators of the systems are not material. What is material from a technological perspective is that the central system 100 and local system 120 are separate systems with mechanisms used to limit transmission of data between the systems in both directions and protect data that is shared through encryption. There are many practical contexts in which it is useful to safeguard the transmission of data in this way.

The central system 100 is configured to implement an anomaly detection stage 101. In some examples, the anomaly detection stage 101 comprises two sub-stages: a seed stage 101A, and a streaming stage 101B.

The seed stage 101A operates on security logs stored in a central log database 105 within the central system 100. It is assumed a certain number of security logs are available to the central system 100 in plaintext. An STM 104 is executed within the central system 100, and extracts log embeddings from the security logs stored in the central log database 105. Log embeddings extracted in this way are referred to as seed embeddings ($E_{seed}$). The seed embeddings are passed to the seed stage 101A for processing in the manner described below.

The streaming stage 101B operates on log embeddings received at the central system 100 from the local system 120. Such log embeddings are referred to a streaming embeddings ($E_{str}$). The streaming embeddings are generated from security logs stored in a local log database 125 within the local system 120. These security logs are retained securely within the local system 120, and not shared with the central system 100. Instead, an encrypted version 104E of the STM 104 is passed from the central system 100 to the local system 120 for execution within the local system 120.

In this particular example, a central encryption component 106 of the central system 100 encrypts the STM 104 using a public encryption key ($K_{pub}$). At the very least, this involves encrypting weights of the STM 104. The public encryption key $K_{pub}$ and the encrypted STM 104E ($K_{pub}$ (STM)) comprising the encrypted weights are passed to the local system 126. A local encryption component 126 of the local system 120 encrypts the security logs stored in the local log database 125 using the public encryption key. The encrypted STM 104E is executed on the encrypted logs within the local system 120, and extracts from each encrypted log on which it is executed an encrypted log embedding. When executed over multiple encrypted logs, the result is a set of encrypted streaming embeddings $K_{pub}$ ($E_{str}$). These are returned to the central system 100, in which a central decryption component 108 decrypts the streaming embeddings using a private key counterpart to the public key, $K_{pr}$, held securely in the central system 100. The streaming embeddings $E_{str}$ are then provided to the streaming stage 101B in plaintext. A homomorphic or partially homomorphic encryption algorithm is used to encrypt the STM 104 and the local security logs. This means the encrypted STM 104E can be run within the local system 120 without decrypting its weights to directly generate the streaming embeddings in encrypted form (encrypted with the public key). Therefore, within the local system, the STM 104 and the streaming embeddings $E_{str}$ are never available in plaintext. Therefore, the user can only use the encrypted STM 104E to generate encrypted embeddings, which they cannot use or themselves; these encrypted are only useful to the security provider in possession of the private key $K_{pr}$. Moreover, they can be transmitted safely to the central system 100, because they are similarly useless to any party intercepting such transmissions who is not in possession of the private key $K_{pr}$.

Although a single local system 120 is shown in FIG. 1, the techniques can be extended to multiple such systems operated by different users, enabling log embeddings to be collected securely from a range of users.

The seed stage 101A and streaming stage 101B are described in detail below. Both stages involve an anomaly detection method applied to log embeddings. The system applies the anomaly detection method to log embeddings, and receives an anomalous embedding(s) as output of the method. An overall aim is to identify and store a diverse set of anomalous log embeddings in an anomalous embedding database 102. 'Diverse' in this context implies active measures to avoid retaining overly similar log embeddings.

In some implementations of the streaming stage 101B, an anomaly detection on a streaming embedding triggers one or more security actions 109A, such as those mentioned above (e.g., modifying a parameter or isolating an entity within the local system 120), within the local system 120 from which the streaming embedding was received. For example, a warning message may be transmitted from the central system 100 to the local system 120, which in turn causes a security action(s) to be performed within the local system 120. The warning message may comprise the log embedding identified as anomalous or some other identifier enabling the corresponding security log to be identified within the local system 120.

The anomalous embedding database 102 can alternatively or additionally be used to train or otherwise configure a detector 107. For example, a pattern-based detector can be trained, built or tuned based on specific patterns associated with anomalous log embeddings held in the anomalous embedding database 102. Once configured in this manner, the detector 107 can be deployed in a deployment stage 103, e.g. to the local system 120 or to another system. Once deployed, the detector 107 operated on incoming security logs and/or log embeddings, with a positive detection (e.g. a specific pattern match) triggering one or more security actions 109B. Multiple detectors may be configured in this way, for example based on different identified patterns.

Expanding on the above, in the anomaly detection stage 101, at least one anomaly detection method is applied to large volume of cybersecurity logs to identify a subset of anomalous security logs. To perform the anomaly detection stage, the security logs are reduced to semantic embeddings (a form of dimensionality reduction). A log embedding means an embedding numerically representing a security log from which it is extracted. For example, a log embedding may take the form of a numerical feature vector extracted from a security log. Once the security logs have been reduced to log embedding, the anomaly detection stage becomes a task of identifying any anomalous security log embeddings. Anomaly detection may, for example, be implemented using unsupervised machine learning (ML) techniques. Anomaly detection applied to log embeddings is referred to herein as "log pattern detection".

One form of anomaly detection is based on outlier detection. In some implementations, the incoming cybersecurity logs are used to build a model (e.g., in the form of a statistical distribution) of 'normal' security logs, and anomalous security logs are identified as outliers to this learned distribution.

In other implementations, a Graph Neural Network (GNN) is used for anomaly detection. One such implementation uses a specific form of unsupervised anomaly detection based on attributed networks as described in Zhiming Xu et. al., "Contrastive Attributed Network Anomaly Detection with Data Augmentation". In this case, an embedding graph is constructed from the security log embeddings. A graph-based neural network encoder is used to embed the embedding graph in a lower-dimensional space, resulting in a lower-dimensional representation, and a decoder is used to reconstruct the embedding graph from the lower-dimensional representation. Anomalous log embeddings are identified as those having relatively high reconstruction errors. Note, there are two levels of embedding in this case: the embedding of the individual security logs, and the further embedding of the embedding graph.

A GNN is a specific type of neural network capable of working with a graph data structure. They are highly influenced by Convolutional Neural Networks (CNNs) and graph embedding. GNNs are used in predicting nodes, edges, and graph-based tasks. An embedding graph is generated based on the embeddings of security logs. For a group of embeddings, each embedding is viewed as a node. A Euclidean or cosine distance between each pair of the embeddings is computed. The embedding graph is created by assigning edges between embeddings that are closer than a threshold. A GNN may be pre-trained trained on an embedding graph with known cluster ids and classification labels. Embeddings with known classification labels and cluster ids may be embeddings known to be associated with specific known security attacks. For example, a small subset of the seed data may have labels, which can be used to pre-train the GNN. For unlabelled embeddings in the seed stage or the streaming stage, the pre-trained GNN may be applied to an embedding graph with embeddings with cluster ids only so as to predict the classification labels.

In the context of anomaly detection applied to a batch of log embeddings, the embedding graph is built from the log embeddings contained in the batch.

Security log embeddings are extracted using a trained ML model, such as a neural network. In some implementations, a domain-specific transformer neural network is used, which has been trained on training data specific to the domain of cybersecurity. The STM 104 of FIG. 1 is one example of such a model.

The anomaly detection stage 101 is performed to build the anomalous embedding database 102. Log embeddings (rather than the full logs) are stored in the anomalous embedding database 102. Moreover, only log embeddings identified as anomalous are stored. This significantly reduces the storage overhead. An additional reduction in storage overhead is achieved by storing only log detections that (1) have been identified as anomalous and (2) are sufficiently different from any exiting log embedding stored in the database. Similar with existing log embedding may for example be calculated based on distance in embedding space (e.g., angular distance between embedding feature vectors).

The seed stage 101A uses a batch of centrally-stored logs held in the central log database 105. Log pattern detection is used to identify a set of anomalous logs in the seed batch and subsampling is performed to identify a smaller subset of anomalous logs. Subsampling means a process of log based on embedding dissimilarity. The subset of anomalous logs is stored in the anomalous embedding database. In the steaming stage 101B, further log embeddings are received and processed in batches. As in the seed stage 101A, log pattern detection is performed in the streaming stage 101B on each batch of logs to identify any anomalous log embeddings in the batch. Each anomalous log embedding is compared against the log embeddings already stored in the database and is only added to the database if it is sufficiently different from any existing log embedding in the anomalous embedding database.

In the seed stage 101A, an initial volume of security log data is thus used to "seed" the database; in the streaming stage 101B, as the database grows, the central system 100 will become more selective about which anomalous log embeddings are retained. This may be characterised as a form of embedding deduplication. Similarity may be assessed using a threshold applied to distance or some function of distance (e.g., distance modulus or distance squared, where distance may be e.g. Euclidian distance or cosine distance), whereby embeddings are said to match if they are within this threshold with respect to each other.

Once the anomalous embedding database 102 has reached a certain size, it can be used in or to support the deployment stage 103.

In some examples, a grouping component 136 groups anomalous log embeddings in the anomalous embedding database 102 to form anomalous embedding groups. Such grouping is performed in some examples based on a label or set of multiple labels assigned to each anomalous log embedding.

In some such examples, a threat classification model 132 is used to assign a classification label to each security log embedding, and the anomalous log embeddings are grouped based on classification labels. The threat classification model 132 is pre-trained using security logs with known threat labels. For example, security logs which have been collected and analysed during or following a confirmed cyberattack may be assigned appropriate threat labels by an analysis (e.g. indicating a particular attack type or method).

In some such examples, the threat classification model 132 takes the form of a classification GNN built on top of the semantic index to find hierarchical patterns. Note, this is separate from the GNN that is used in some embodiments to perform anomaly detection. Whereas the anomaly detection GNN detect anomalies in an unsupervised manner based on reconstruction error, the classification GNN is a supervised model. The classification GNN also operates on a different embedding graph, constructed in the manner described above from the diverse subset of anomalous log embeddings retained in the anomalous embedding database 102.

In other examples, anomalous log embeddings in the anomalous embedding database 102 are grouped based on cluster labels assigned using unsupervised clustering 134 applied to the anomalous embeddings held in the anomalous embedding database 102.

In some implementations, both classification and clustering labels are used to group anomalous log embeddings in the database, e.g. with log embeddings having both a matching threat label and a matching cluster label being grouped together.

Figure 6:
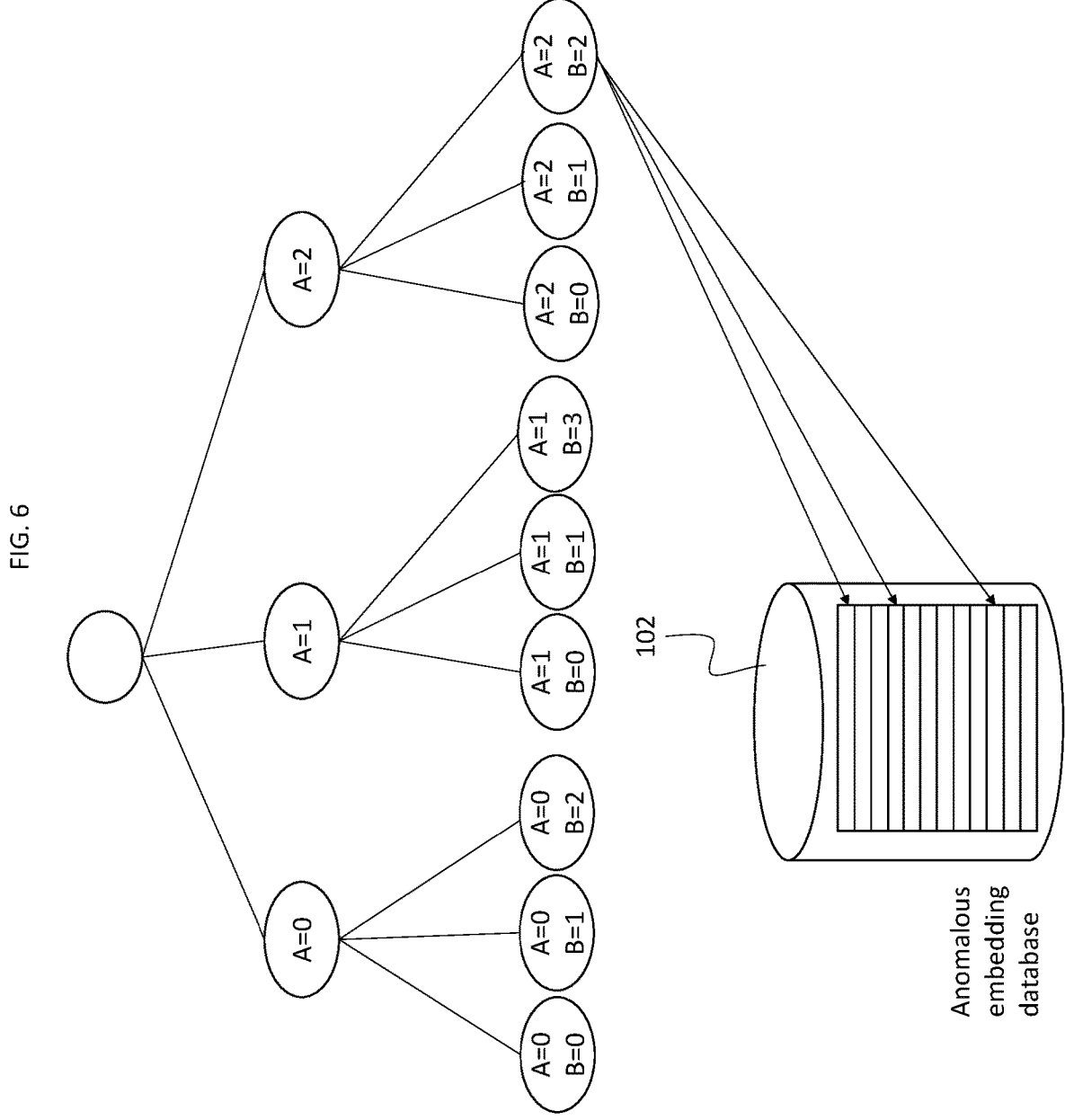
FIG. 6 shows an example decision tree index.

In one implementation, each anomalous embedding groups corresponds to a node of a decision tree index that supports efficient lookup on the database. In this case, the grouping component 136 operates as an indexing component that generates the decision tree index based on the label or labels assigned to each anomalous log embedding. An example of a decision tree index is shown in FIG. 6, which is described in detail below. Grouping together of logs allows slower-developing attack patterns to be identified within a group of logs, where signatures of a particular attack might appear in multiple logs over time.

Having grouped anomalous embeddings together, an analysis is performed to identify any common patterns exhibited within an anomalous embedding group. For example, a common pattern exhibited across a subset of embedding dimensions may be identified. If so, this can be used as a basis for computationally efficient threat detection in the deployment stage, by configuring the detector 107 (or multiple detectors) to identify similar patterns in that subset of embedding dimension(s) in a log embedding received as input. In the example deployment scenario of FIG. 1, embeddings are extracted from new logs and the detector operates on the log embeddings. For example, if the detector 107 has an ML architecture, it may be trained to identify such patterns based on an identified group of log embeddings.

For embeddings corresponding to centrally-stored logs in the central log database 105, common patterns may also be identified in the underlying logs themselves, the detector 107 (or multiple detectors) may be configured to identify matching patterns in a security log received as input at deployment. In this deployment scenario, the detector 107 operates on the logs themselves. For example, if the detector 107 has an ML architecture, it may be trained to identify such patterns based on an identified group of security logs.

The two approaches described above may be combined to configure the detector 107 to operate on both log embeddings and the security logs themselves.

Reducing the size of the anomalous embedding database 102 through embedding deduplication yields a consequent improvement in computational efficiency of subsequent operation or analysis performed on the database, because fewer comparison operations need to be performed, without reducing performance as the embedding deduplication resulting in negligible information loss.

As noted, detections triggered in the deployment stage 103, in turn, trigger appropriate security mitigation actions 109B, such as those mentioned above. An incoming security log or log embedding may be associated with a target system or network (e.g., it may be associated with the local system 120, or another system in which it is deployed), triggering an action in the target system or network (such as modifying a parameter or isolating an entity).

As noted, in certain examples provided herein, a security-specific ML model, such as a security-specific transformer model, is used to extract the log embeddings. Different data formats may be accommodated by training such a model on security logs with different formats. Such a model does not depend on any specific delimiters in the log, nor does it require a log to be in a specific format.

A log embedding is a semantic representative of a word or other character string. Typically, the representation is a real-valued vector that encodes the meaning of the word in such a way that the words that are closer in vector space are expected to be similar in meaning.

In some examples, a transformer model is used to generate the log embeddings. The transformer model is trained on a security-specific training set in some examples. A transformer model trained in this way is referred to as a security transformer model (STM).

In one implementation, an encoder-only transformer architecture is used, with an STM pretrained from scratch on existing security logs using a transformer architecture described in DeBERTa (arXiv: 2006.03654). The STM comprises a series of encoder layers. It first transforms an input log into a list of tokens and then transforms the tokens into vectors of fixed length. The STM also adds positional encoding vectors to help the model understand the order of tokens. The resulting vector is fed into a sequence of encoding layers where the STM model uses an attention mechanism to learn the relation between tokens, and to create semantic meaning. A log embedding is generated at a final one of the encoding layers. The weights in the encoding layers are trained with masked language modeling task. In this task, parts of the security logs are masked out and the STM is trained to predict the masked out parts. After sufficient training, the model can predict masked out tokens with high accuracy. At this point, it is able to generate high quality log embeddings capturing security-specific semantic knowledge.

An STM or other ML model trained on a security-specific dataset is able to extract semantic embeddings capturing domain-specific security knowledge learned in training. In the following examples, an STM is implemented as an encoder-based transformer model (e.g. the encoder only transformer model described above), and its embeddings enable the central system 100 and the local system 120 to normalize input data and enable different format of input data to be utilized machine learning algorithms. This provides a flexible way to handle multiple data formats.

Log-sub-sampling is used to perform a subsampling of the STM embeddings with a focus on generating a diverse subset using either clustering or greedy distance maximization. Compared to traditional log storage technologies, this method uses the knowledge of a security specific language model, which may be a security specific language transformer model to find patterns in the data and sub sample logs for efficient storage.

When log-subsampling is done using a clustering method, an embedding is selected from each resulting and added to the database of anomalous log embeddings 102. The embedding selected from each cluster may, for example, be a cluster mean or an embedding which lies the closest to the cluster mean. may be selected (the latter is always guaranteed to correspond to an actual security log, whereas the cluster mean itself is an aggregation over multiple security logs).

When log-subsampling is done using a greedy distance maximisation method, a first log embedding is selected initially. For example, the first log embedding may be selected based on a reference point in embedding space (e.g., a centre of all embeddings). For example, the first embedding may be selected because it is closest to the reference point (e.g. center/mean of all embeddings). Next, a second embedding is selected, as the embedding furthest from the first embedding in embedding space. Next, for each remaining embedding, a minimum distance to each embedding selected so far is determined, and a third embedding having the largest minimum distance to any selected embedding is selected. This means, for each remaining embedding, determining the distance to each selected embedding, selecting the minimum of these distances (the minimum distance), and identifying the largest of these minimum distances (the maximum minimum distance). This 'min-max' operation ensures diversity as it ensures subsequent selections are relatively distant from all embeddings that have been selected so far. This process repeats until a predetermined number, N, of embeddings have been selected.

Log-pattern detection is used to find anomalous logs using an outlier detection method. Log-pattern-detection trains a model to predict links between high similarity data points and detect outliers in a data which have high reconstruction error. Anomalies and attacks may be found based on semantic relationships encoded by a security-specific transformer model. For example, the STM embeddings may be used to compute similarity and pairwise distances.

A threshold, representing the distance between the candidate log embedding and a non-anomalous embedding, may be defined and may be used to classify a candidate log embedding as anomalous.

Figure 2:
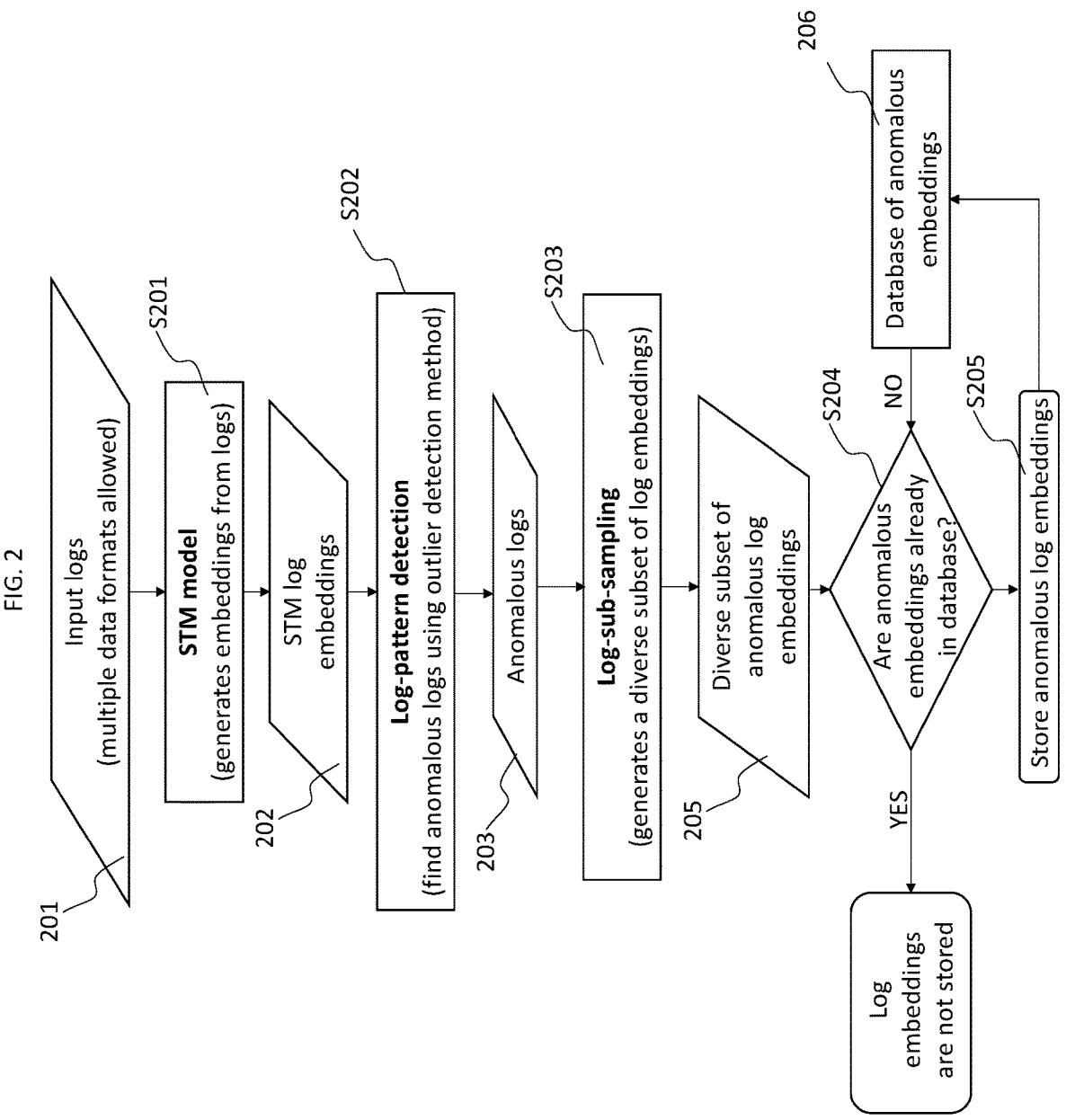
FIG. 2 shows a pipeline of a method wherein anomalous logs are detected and stored using log-pattern detection applied to log embeddings.

FIG. 2 shows a pipeline of a method wherein anomalous logs are detected using log-pattern detection applied to a log-sub-sampled subset of STM embeddings. A batch of input logs 201, in multiple possible data formats, are fed to a STM model which generates STM log embeddings 202 from the input logs 201 in step S201. In step S202, log-pattern detection is applied to the STM log embeddings 202 to find anomalous logs 203 within the batch of logs using an outlier detection method. In step S203, log-sub-sampling is performed on the anomalous log embeddings 203, to generate a diverse subset 205 of anomalous log embeddings. It is determined in step S204 whether the anomalous log embeddings 205 are already stored in a database 206 of anomalous embeddings (such as database 102 of FIG. 1). If the log embeddings 205 are not already stored in the database 206 of anomalous log embeddings, they are then stored, in step S205, in the database 206 of anomalous log embeddings. In the case that the log embeddings 205 are found to be already stored in the database 206 in step S204, the log embeddings 205 are not stored in the database 206.

FIG. 2 broadly encompasses both the seed stage 101A and the streaming stage 101B of FIG. 1.

In some implementations of the streaming seed 101A, the comparison S204 against database 206 may be omitted. For example, if a single batch of logs is processed in the streaming stage S203, the comparison may be unnecessary (as database 202 is empty at that point), because the log subsampling step S203 ensures sufficient diversity.

In some implementations of the streaming stage 101B, log subsampling S203 may be omitted. In that case, each anomalous log embedding identifies via log pattern detection in step S202 may be compared against existing embeddings held in database 206, with the method proceeding from S202 directly to S204. Depending on the implementation specifics, it may be more efficient to perform log subsampling in the streaming stage 101B and compare only the subset of anomalous log embeddings identified via subsampling with the existing embeddings held in database 206; or, in other cases, it may be more efficient to compare each identified anomalous log embedding against database 206.

The database of anomalous embeddings 206 is an efficient way of storing logs is anomalous embeddings for detecting anomaly and attacks in large amounts of data. The storage index provides a flexible way to handle multiple data formats. The database may have a tree structure and a semantic index and can be thus queried.

In the seed stage 101A, log-pattern-detection is applied to seed logs followed by log-sub-sampling to create an initial index. In a streaming stage 101B, log-pattern-detection is applied to new data, new anomalous embeddings are compared to stored samples, new clusters are dynamically created or diversity is added to existing clusters.

Figure 3:
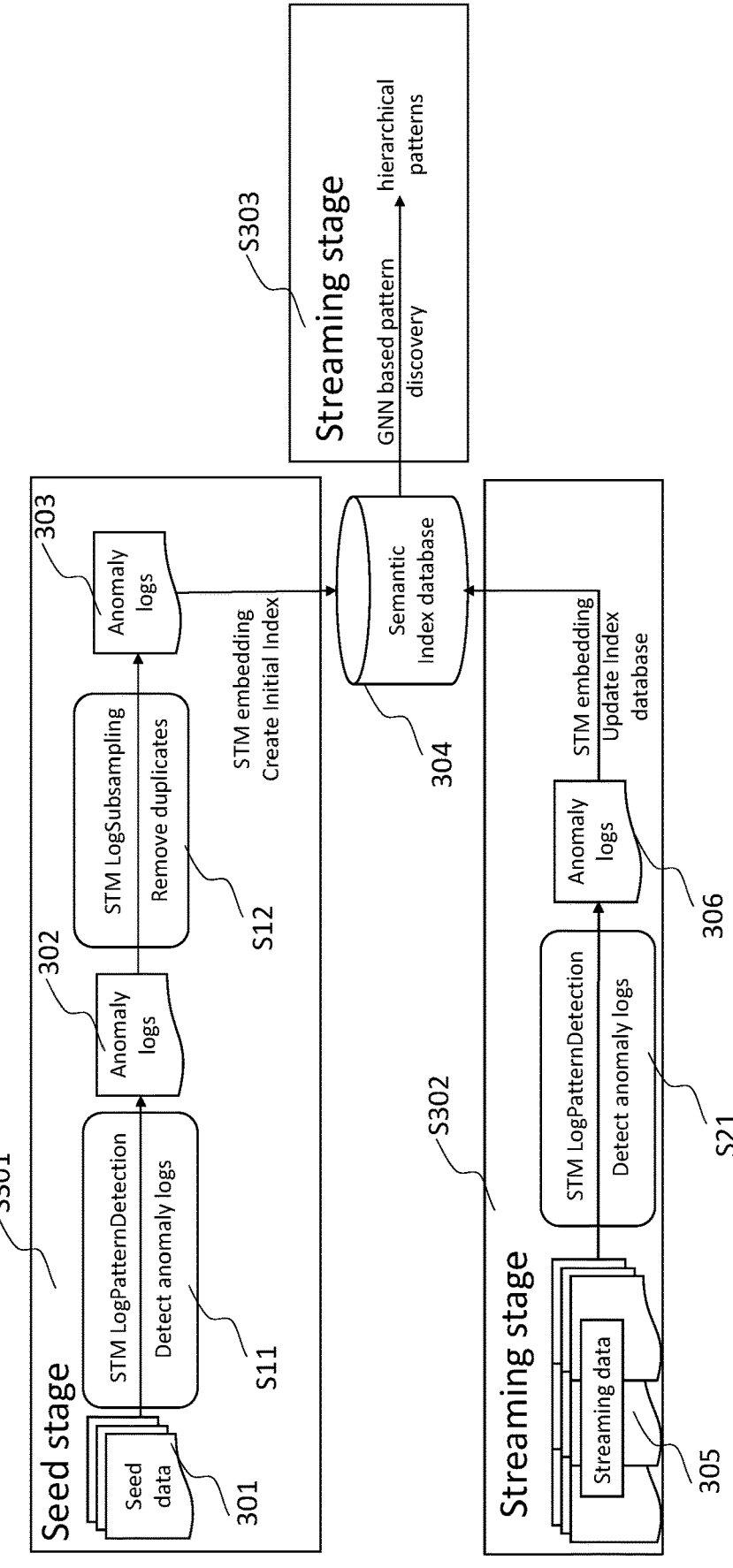
FIG. 3 shows an example flow chart of the seed stage and the streaming stages of the log anomaly detection method.

FIG. 3 shows an example flow chart of the seed stage and the streaming stages of the log anomaly detection method described above. In the seed stage S301, seed data 301 is used as input to step S11 where log-pattern detection is applied to STM log embeddings of logs in the seed data 301 to detect anomaly logs. The anomalous logs 302 are used as input to step S12 where log-sub-sampling is applied to the anomaly logs 302 and duplicate anomaly logs are removed. The STM embeddings of the sub-sampled anomaly logs 303 are used to create an initial index for the semantic index database 304. In the streaming stage S302, streaming data 305 is used as input to stap S21 where log-pattern detection is applied to STM log embeddings of logs in the streaming data 305 to detect anomaly logs. The STM embeddings of the anomalous logs 306 are used to update the semantic index database 304. In a second streaming stage S303, GNN-based pattern discovery methods are applied to the semantic index database 304 to derive hierarchical patterns in the database 304.

The GNN is an anomaly classification algorithm which provides a second layer of detection. Other clustering algorithms may be used. The GNN runs on the embedding graph created from the embeddings in the database of anomalous embeddings. This unsupervised pipeline allows detected anomalies and attacks to be segmented to discover raw common entities, e.g., new or unknown anomalies and attacks.

For example, a decision tree may be generated with classification labels and cluster identifiers (ids) or other cluster labels, as described in further detail below with reference to the example of FIG. 6. For a given leaf in the decision tree, all data which corresponds to the leaf may be selected and a name entity recognition (NER) algorithm may be run on the selected data; the leaf may then be represented as the collection of all common entities associated with the classification label of the leaf. This results in a tree like structure which organizes data by pattern whose leaf nodes describe different common groupings of entities.

The anomaly classification and hierarchical patterns may be used to build a security model that, for example, assigns a particular security action for a particular common entity or dimension pattern detected at a leaf of the decision tree. A security action may, for example, be an alert to a user.

Figure 4:
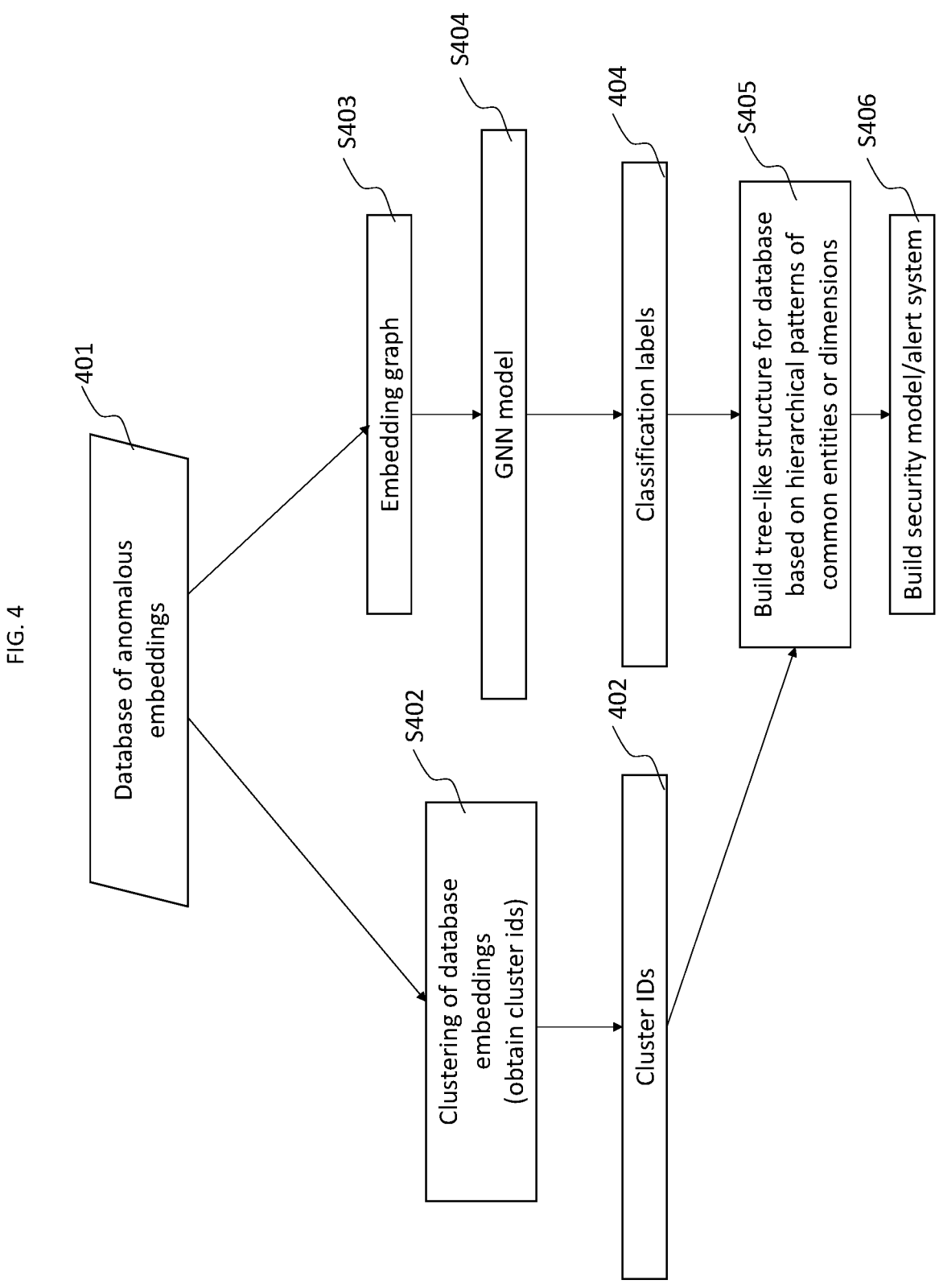
FIG. 4 shows a flowchart of a method of deriving hierarchical patterns from a database of anomalous embeddings.

FIG. 4 shows a flowchart of a method of deriving hierarchical patterns from a database of anomalous embeddings. In step S402, a clustering method is applied to the database of anomalous embeddings 401 and cluster labels (ids) 402 are assigned to every embedding. In step S403, an embedding graph is generated based on the embeddings of security logs. For a group of embeddings, each embedding is viewed as a node. The Euclidean or cosine distance between each pair of the embeddings is computed. The embedding graph is created by assigning edges between embeddings that are closer than a threshold. In step 404, a GNN model is applied to the embedding graph generated from database 401 of anomalous embeddings. An unsupervised GNN model may be used to discover new common entities from the anomalous embeddings. Additionally, or alternatively, the GNN may be trained to classify the anomalous embeddings into known common entities. The GNN model is pre-trained on training embeddings with known classification labels. For example, the training embeddings may be extracted from security logs known to be associated with specific known security attacks. The output 404 from the GNN model is a classification label assigned to each node of the embedding graph. In step S405, hierarchical patterns in the common entities derived from the embedding graph 404, are used to build a tree-like structure for the database using the cluster ids and classification labels. In Step S406, a security model, such as an alert system, may be build based on the anomaly classification or tree-structure of the database.

Federated Storage is a system that brings together various storage resources into one single management system. Many forms of storage can be connected, such as servers, cloud accounts, etc.

The above-described method may be used with federated data. The seed stage is run in centralized storage. The streaming stage is run in each data store to create embeddings and only the sample embeddings are moved to the centralized storage, not the user data. During the streaming stage, the candidate log embedding may be generated by the user locally. The candidate log embedding is then sent to a central server. The STM is run without decrypting weights used in creating the embeddings. In the federated learning scenario, the encrypted STM model is sent to users. The users run the encrypted STM model to generate embeddings on their data. Only the embedding is passed to the central storage and the users' security data is not passed to central storage. As indicated, this federated solution stores user data in a federated way and no user data is stored centrally. Users are not required to share the log itself to the central server. The user can maintain the privacy of the log's by generating the log embedding locally and sending the log embedding (not the log itself) to the central server.

Figure 5:
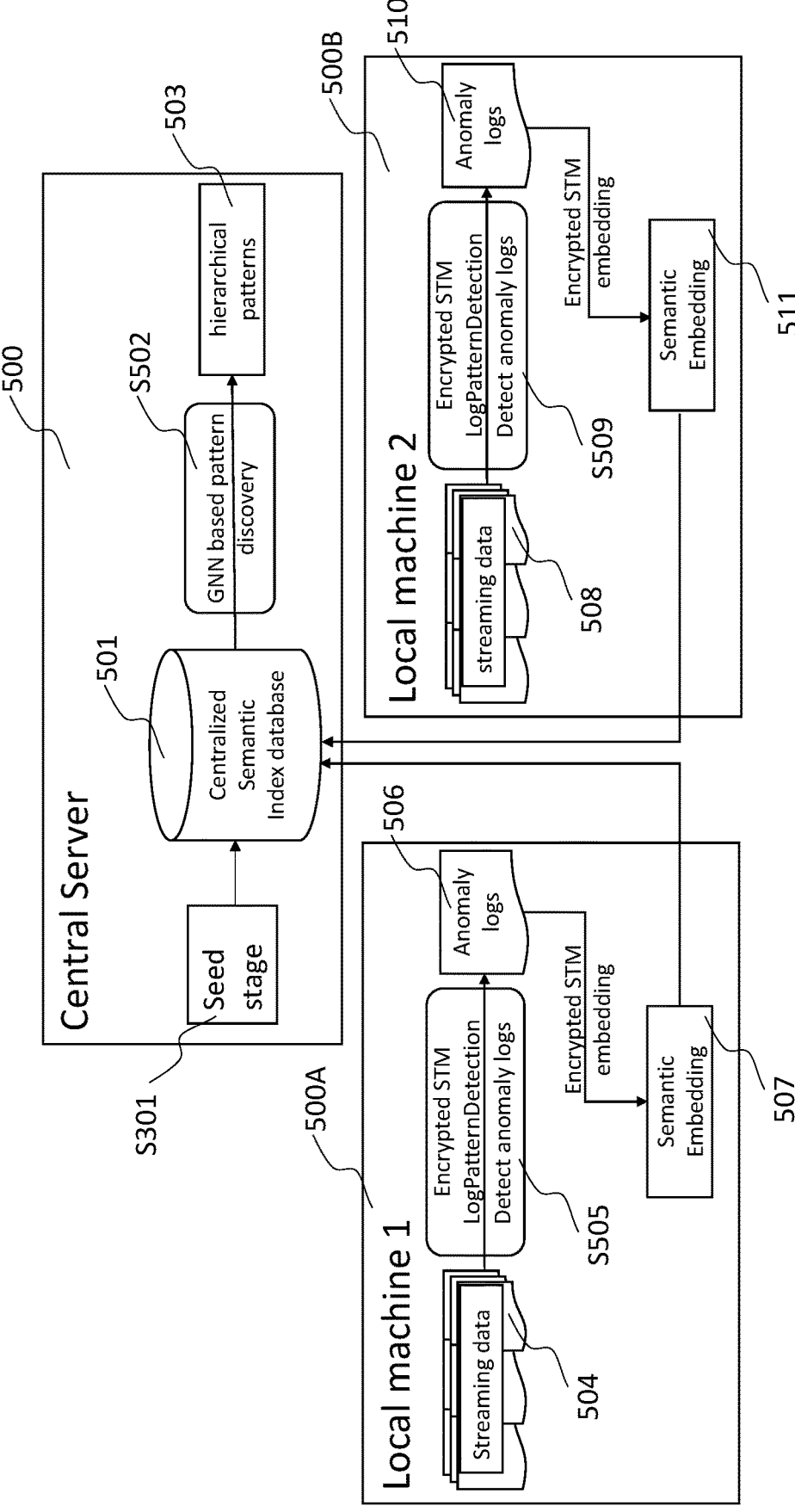
FIG. 5 shows a flowchart for detecting and storing anomalous log embeddings to a database hosted on a central server.

FIG. 5 shows a flowchart for detecting and storing anomalous log embeddings to a database 501 hosted on a central server 500. The seed stage S301 is run on the central server 500. Local machine 1 500A and local machine 2 500B each run streaming stages. On local machine 1 500A, log-pattern detection is run on streaming data 504 in step S505 to find anomaly logs 506. The STM semantic embeddings 507 of the anomaly logs 506 are sent to the central server 500 to update the centralised semantic database 501. In parallel, on local machine 2 500B, log-pattern detection is run on streaming data 508 in step S509 to find anomaly logs 510. The STM semantic embeddings 511 of the anomaly logs 510 are sent to the central server 500 to update the centralised semantic database 501. On the central server 500, a GNN-based pattern discovery method is run on the centralised semantic index database 501 in step S502 to find hierarchical patterns 503.

FIG. 6 shows an example decision tree index. The decision tree index supports pattern-based partitioning with a query-able semantic key enables more efficient search by combining unsupervised pattern detection and semantic representation. A tree index structure is used where branches are separated by labels. A new piece of data may be assigned to a leaf by according to its labels. For example, for data with labels A, B, a first leaf may correspond to label combination (A=0, B=0), and a second leaf might correspond to label combination (A=0, B=1). A new log embedding with labels A=0, B=1 is assigned to the second leaf in this case. For example, label A may be a classification label and label B may be a cluster label.

The tree index supports efficient data retrieval. Each leaf node stores a reference to its assigned log embeddings in the anomalous embedding database 102. In this example, a first level of the decision tree index comprises a node for each possible value of label A (0, 1 and 2 in this example). Each of these nodes, in turn, has a child node (in a second level of the decision tree index) for each possible value of label B (0, 1, 2). In this particular example, there are only two classification labels, hence the nodes at the second level are leaf nodes. Each leaf node contains a reference to each of its assigned log embeddings in the anomalous log embedding database 304. Hence, to retrieve logs with labels (A=2, B=2), a search of the decision tree index is performed to locate the corresponding leaf node, which in turn is used to locate the corresponding log embeddings in the database 304. The search of the decision tree index can be performed in a computationally efficient manner; in this example, it involves locating the A=2 node, and then locating the A=2, B=2 child node of the A=2 node. With M possible values of label A and N possible values of label B, the search can be performed with computational complexity M+N, compared with a naive search of complexity N*M.

The decision tree represents the index on the database. The decision tree leaf composition may be analysed to identify common log elements or embedding dimensions for use in configuring the detector 107. With structured logs, an element might for example correspond to specific database column or data field.

For seed data used in the seed stage, the log contents are held in the central log database 105 and, for a given leaf in the decision tree, a column in the logs and a specific column value (or subset of possible column values) might be identified as a common entity.

For streaming data used in the streaming stage, the log contents are not sent to the centralized storage. Hence, in the architecture of FIG. 1, this would only be possible for the seed embeddings $E_{seed}$.

For both the seed embeddings $E_{seed}$ and streaming embeddings $E_{str}$, for a given leaf in the decision tree, a dimension (or subset of dimension) plus a range of values of that (or those) dimension(s) may be identified as a common entity.

FIG. 7 schematically shows a non-limiting example of a computing system 700, such as a computing device or system of connected computing devices, that can enact one or more of the methods or processes described above, including the filtering of data and implementation of the structured knowledge base described above. Computing system 700 is shown in simplified form. Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 7. Logic processor 702 comprises one or more physical (hardware) processors configured to carry out processing operations. For example, the logic processor 702 may be configured to execute instructions that are part of one or more applications, programs, routines, libraries, objects, components, data structures, or other logical constructs. The logic processor 702 may include one or more hardware processors configured to execute software instructions based on an instruction set architecture, such as a central processing unit (CPU), graphical processing unit (GPU) or other form of accelerator processor. Additionally or alternatively, the logic processor 702 may include a hardware processor(s)) in the form of a logic circuit or firmware device configured to execute hardware-implemented logic (programmable or non-programmable) or firmware instructions. Processor(s) of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 702 may be virtualized and executed by remotely accessible, networked computing devices configured in a cloud-computing configuration. In such a case, these virtualized aspects are run on different physical logic processors of various different machines. Non-volatile storage device 706 includes one or more physical devices configured to hold instructions executable by the logic processor 702 to implement the methods and processes described herein. When such methods and processes are implemented, the state of non-volatile storage device 706 may be transformed—e.g., to hold different data. Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive), or other mass storage device technology. Non-volatile storage device 706 may include nonvolatile, dynamic, static, read/write, read-only, sequential-access, location-addressable, file-addressable, and/or content-addressable devices. Volatile memory 704 may include one or more physical devices that include random access memory. Volatile memory 704 is typically utilized by logic processor 702 to temporarily store information during processing of software instructions. Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine"

may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 708 may be used to present a visual representation of data held by non-volatile storage device 706. The visual representation may take the form of a graphical user interface (GUI). As the herein-described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices. When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the internet. The term computer readable media as used herein may include computer storage media. Computer storage media may include volatile and non-volatile, removable and nonremovable media (e.g., volatile memory 704 or non-volatile storage 706) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 700 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

A first aspect herein provides a computer-implemented method, comprising: receiving a plurality of log embeddings from a trained machine learning (ML) model each log embedding numerically representing a security log; identifying an anomalous log embedding from the plurality of log embeddings using an anomaly detection method; comparing the anomalous log embedding to known anomalous log embeddings stored in an anomalous embedding database; responsive to determining that the anomalous log embedding is different from any of the known anomalous log embeddings, storing the anomalous log embedding in the anomalous embedding database; and triggering a security mitigation action based on the anomalous log embedding.

Triggering the security mitigation action may comprise transmitting a warning message from a central system to a local system, the message causing the security mitigation action to be performed in the local system.

The method may comprise identifying within the anomalous embedding database an anomalous embedding group comprising multiple anomalous log embeddings, the multiple anomalous log embeddings including the anomalous log embedding; detecting a common pattern exhibited across the multiple anomalous log embeddings; and configuring a pattern-based detector based on the common pattern; wherein triggering the security mitigation action may comprise causing the pattern-based detector to be applied to an incoming security log, the security action caused to be performed responsive to the incoming security log triggering a detection in the pattern-based detector.

Causing the pattern-based detector to be applied to an incoming security log may comprise deploying the pattern-based detector to a target system The security mitigation action may comprise generating an alert at a user interface, modifying a setting or parameter of a computer system associated with the security log, or isolating a component of a computer system associated with the security log.

The common pattern may be exhibited in a subset of one or more embedding dimensions, and the pattern-based detector may be configured to operate on the subset of one or more embedding dimensions.

The method may comprise receiving multiple security logs respectively corresponding to the multiple anomalous log embeddings, wherein the pattern may be identified across the multiple security logs.

The method may comprise assigning multiple labels to each anomalous log embedding using a threat classification model applied to the anomalous embedding database or a clustering method applied to the anomalous embedding database, wherein the anomalous embedding group may be identified based on the multiple labels assigned to each anomalous log embedding.

The trained ML model may be a transformer model trained on a security-specific training set.

The method may comprise receiving a plurality of seed security logs; extracting from each seed security log a seed embedding, resulting in a plurality of seed embeddings; extracting a plurality of anomalous seed embeddings from the plurality of seed embeddings using the anomaly detection method applied to the seed embeddings; extracting, via subsampling, one of (e.g. some or all of) the known anomalous log embeddings from the plurality of anomalous seed embeddings.

The method may be performed in a central system in which the plurality of seed security logs may be stored the method comprising transmitting the trained ML model from the central system to a local system in encrypted form, wherein the plurality of log embeddings may be received at the central system from the local system in encrypted form. The method may further comprise decrypting the plurality of log embeddings at the central system.

The subsampling may comprise identifying via unsupervised clustering a cluster of anomalous seed embeddings within the plurality of anomalous seed embeddings, and extracting the known anomalous log embedding from the cluster of anomalous seed embeddings.

The subsampling may comprise selecting the known anomalous log embedding from the plurality of anomalous seed embeddings using greedy distance maximization in embedding space.

The ML model may be a security-specific transformer model.

The anomaly detection method applied to the plurality of log embeddings may comprise generating from the plurality of log embeddings an embedding graph, embedding the embedding graph in a lower-dimensional space, resulting in a lower-dimensional representation, generating using a decoder a reconstructed embedding graph, and identifying the anomalous log embedding based on a reconstruction error.

The anomaly detection method may identify the anomalous log embedding based on outlier detection.

A second aspect herein provides a computer system comprising: at least one memory configured to store computer-readable instructions; and at least one hardware processor coupled to the at least one memory, and configured to execute the computer-readable instructions, which upon execution cause the at least one hardware processor to implement operations comprising: receiving a plurality of log embeddings from a trained machine learning (ML) model structured to extract a log embedding from an input security log; identifying an anomalous log embedding from the plurality of log embeddings using an anomaly detection method; comparing the anomalous log embedding to known anomalous log embeddings stored in an anomalous embedding database; responsive to determining that the anomalous log embedding is different from any of the known anomalous log embeddings, storing the anomalous log embedding in the anomalous embedding database; identifying within the anomalous embedding database an anomalous embedding group comprising multiple anomalous log embeddings, the multiple anomalous log embeddings including the anomalous log embedding; detecting a common pattern exhibited across the multiple anomalous log embeddings;

and configuring a pattern-based detector to detect the common pattern in a security log or log embedding received as input.

The terminology 'at least one memory' and 'at least one processor' is used to mean the operations in question may be performed on a single processor or distributed across multiple processors.

A third aspect herein provides a computer-readable storage medium embodying computer-readable instructions, which upon execution on a hardware processor, cause the hardware processor to implement operations comprising: transmitting from a central system to a local system in encrypted form a trained machine learning (ML) model structured to extract log embeddings from security logs; receiving from the local system a plurality of encrypted log embeddings; decrypting the plurality of encrypted log embeddings, resulting in a plurality of decrypted log embeddings; extracting an anomalous log embedding from the plurality of decrypted log embeddings using an anomaly detection method applied to the plurality of decrypted log embeddings; and triggering a security mitigation action based on the anomalous log embedding.

In embodiments, the security mitigation action may be triggered in the local system.

The anomalous log embedding may be one of multiple anomalous log embeddings. Said operations may comprise: identifying an anomalous embedding group comprising the multiple anomalous log embeddings; detecting a common pattern exhibited across the multiple anomalous log embeddings; configuring a pattern-based detector based on the common pattern; and wherein triggering the security mitigation action may comprise causing the pattern-based detector to be applied to an incoming security log, the security mitigation caused to be performed responsive to the incoming security log triggering a detection in the pattern-based detector.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claim.

The invention claimed is:

1. A computer-implemented method, comprising:
transmitting from a central system to a local system in encrypted form a trained machine learning (ML) model structured to extract log embeddings from a security log;
receiving a plurality of log embeddings from the trained ML model, the plurality of log embeddings numerically representing the security log;
identifying an anomalous log embedding from the plurality of log embeddings using an anomaly detection method;
and
triggering a security mitigation action based on the anomalous log embedding.

2. The method of claim 1, wherein triggering the security mitigation action comprises transmitting a warning message from a central system to a local system, the message causing the security mitigation action to be performed in the local system.

3. The method of claim 1, comprising:
identifying within an anomalous embedding database an anomalous embedding group comprising multiple anomalous log embeddings, the multiple anomalous log embeddings including the anomalous log embedding;
detecting a common pattern exhibited across the multiple anomalous log embeddings; and
configuring a pattern-based detector based on the common pattern;
wherein triggering the security mitigation action comprises causing the pattern-based detector to be applied to an incoming security log, the security mitigation action caused to be performed responsive to the incoming security log triggering a detection in the pattern-based detector.

4. The method of claim 3, wherein causing the pattern-based detector to be applied to an incoming security log comprises deploying the pattern-based detector to a target system.

5. The method of claim 3, wherein the security mitigation action comprises generating an alert at a user interface, modifying a setting or parameter of a computer system associated with the security log, or isolating a component of the computer system associated with the security log.

6. The method of claim 3, wherein the common pattern is exhibited in a subset of one or more embedding dimensions, and the pattern-based detector is configured to operate on the subset of one or more embedding dimensions.

7. The method of claim 3, comprising:
receiving multiple security logs respectively corresponding to the multiple anomalous log embeddings, wherein the common pattern is identified across the multiple security logs.

8. The method of claim 3, comprising:
assigning multiple labels to the anomalous log embedding of the multiple anomalous log embeddings using a threat classification model applied to the anomalous embedding database or a clustering method applied to the anomalous embedding database, wherein the anomalous embedding group is identified based on the multiple labels assigned to the anomalous log embedding.

9. The method of claim 1, wherein the trained ML model is a transformer model trained on a security-specific training set.

10. The method of claim 1, comprising:
receiving a plurality of seed security logs;
extracting from the plurality of seed security logs a plurality of seed embeddings;
extracting a plurality of anomalous seed embeddings from the plurality of seed embeddings using the anomaly detection method applied to the seed embeddings;
extracting via subsampling a known anomalous log embedding from the plurality of anomalous seed embeddings.

11. The method of claim 1, wherein the plurality of log embeddings are received at the central system from the local system in encrypted form, the method further comprising decrypting the plurality of log embeddings at the central system.

12. The method of claim 10, wherein the subsampling comprises identifying via unsupervised clustering a cluster of anomalous seed embeddings within the plurality of anomalous seed embeddings, and extracting the known anomalous log embedding from the cluster of anomalous seed embeddings.

13. The method of claim 10, wherein the subsampling comprises selecting the known anomalous log embedding from the plurality of anomalous seed embeddings using greedy distance maximization in embedding space.

14. The method of claim 1, comprising:

comparing the anomalous log embedding to known anomalous log embeddings stored in an anomalous embedding database; and responsive to determining that the anomalous log embedding is different from any of the known anomalous log embeddings, storing the anomalous log embedding in the anomalous embedding database.

15. The method of claim 1, wherein the anomaly detection method applied to the plurality of log embeddings comprises generating from the plurality of log embeddings an embedding graph, embedding the embedding graph in a lower-dimensional space, resulting in a lower-dimensional representation, generating using a decoder a reconstructed embedding graph, and identifying the anomalous log embedding based on a reconstruction error.

16. The method of claim 1, wherein the anomaly detection method identifies the anomalous log embedding based on outlier detection.

17. A computer system comprising:

a memory configured to store computer-readable instructions; and a hardware processor coupled to the memory, and configured to execute the computer-readable instructions, which upon execution cause the hardware processor to implement operations comprising:

receiving a plurality of encrypted log embeddings from a trained machine learning (ML) model structured to extract a log embedding from an input security log;

decrypting the plurality of encrypted log embeddings, resulting in a decrypted plurality of log embeddings;

identifying an anomalous log embedding from the decrypted plurality of log embeddings using an anomaly detection method;

identifying within an anomalous embedding database an anomalous embedding group comprising multiple anomalous log embeddings, the multiple anomalous log embeddings including the anomalous log embedding;

detecting a common pattern exhibited across the multiple anomalous log embeddings; and configuring a pattern-based detector to detect the common pattern in the input security log or the anomalous log embedding received as input.

18. A computer-readable storage medium embodying computer-readable instructions, which upon execution on a hardware processor, cause the hardware processor to implement operations comprising:

transmitting from a central system to a local system in encrypted form a trained machine learning (ML) model structured to extract log embeddings from security logs;

receiving from the local system a plurality of encrypted log embeddings;

decrypting the plurality of encrypted log embeddings, resulting in a plurality of decrypted log embeddings;

extracting an anomalous log embedding from the plurality of decrypted log embeddings using an anomaly detection method applied to the plurality of decrypted log embeddings; and triggering a security mitigation action based on the anomalous log embedding.

19. The computer-readable storage medium of claim 18, wherein the security mitigation action is triggered in the local system.

20. The computer-readable storage medium of claim 18, wherein the anomalous log embedding is one of multiple anomalous log embeddings, said operations comprising:

identifying an anomalous embedding group comprising the multiple anomalous log embeddings;

detecting a common pattern exhibited across the multiple anomalous log embeddings;

configuring a pattern-based detector based on the common pattern; and wherein triggering the security mitigation action comprises causing the pattern-based detector to be applied to an incoming security log, the security mitigation action caused to be performed responsive to the incoming security log triggering a detection in the pattern-based detector.

* * * * *